United States Patent
Loesch et al.

(10) Patent No.: US 10,436,890 B2
(45) Date of Patent: Oct. 8, 2019

(54) METHOD FOR FINDING THE POSITION OF OBJECTS USING AN FMCW RADAR

(71) Applicant: Robert Bosch GmbH, Stuttgart (DE)

(72) Inventors: Benedikt Loesch, Stuttgart (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 311 days.

(21) Appl. No.: 15/317,887

(22) PCT Filed: May 6, 2015

(86) PCT No.: PCT/EP2015/059897
§ 371 (c)(1),
(2) Date: Dec. 9, 2016

(87) PCT Pub. No.: WO2015/188987
PCT Pub. Date: Dec. 17, 2015

(65) Prior Publication Data
US 2017/0115384 A1    Apr. 27, 2017

(30) Foreign Application Priority Data

Jun. 10, 2014  (DE) .................. 10 2014 210 993
Jul. 8, 2014   (DE) .................. 10 2014 213 190

(51) Int. Cl.
*G01S 13/42*  (2006.01)
*G01S 7/35*   (2006.01)
(Continued)

(52) U.S. Cl.
CPC .............. *G01S 13/42* (2013.01); *G01S 7/354* (2013.01); *G01S 13/0209* (2013.01);
(Continued)

(58) Field of Classification Search
CPC ........ G01S 13/42; G01S 13/34; G01S 13/343; G01S 13/02; G01S 13/0209; G01S 13/58;
(Continued)

(56) References Cited

U.S. PATENT DOCUMENTS

| 5,652,589 A | 7/1997 | Ono et al. |
| 2008/0150795 A1 | 6/2008 | Wakayama et al. |

(Continued)

FOREIGN PATENT DOCUMENTS

| CN | 101663594 A | 3/2010 |
| CN | 102798847 A | 11/2012 |

(Continued)

OTHER PUBLICATIONS

International Search Report for the International Application No. PCT/EP2015/059897 dated Jul. 21, 2015.

*Primary Examiner* — Vladimir Magloire
*Assistant Examiner* — Daniel P Malley, Sr.
(74) *Attorney, Agent, or Firm* — Norton Rose Fulbright US LLP; Gerard Messina

(57) ABSTRACT

A method for finding a position of an object using a MIMO FMCW radar. A ramp-shaped frequency-modulated radar signal is transmitted as a sequence of time-delayed successive ramps. A switch network is controlled to provide a corresponding switching state for each of the successive ramps. A different selection of antenna elements is used for transmission of each respective ramp. Radar echoes reflected by radar targets are mixed with the transmitted signal and are down-converted. Baseband signals resulting therefrom are transformed into spectra. Each baseband signal is separately subjected to a two-dimensional Fourier transform. A window function is applied to each of the baseband signals prior to the transform being carried out over a ramp index in a second dimension. A different (Continued)

window function is applied for each of the switching states. The spectra are subjected to a frequency-dependent phase correction which compensates for time offsets of the ramps.

7 Claims, 6 Drawing Sheets

(51) Int. Cl.
*G01S 13/34* (2006.01)
*G01S 13/58* (2006.01)
*G01S 13/02* (2006.01)
G01S 13/536 (2006.01)
G01S 13/93 (2006.01)

(52) U.S. Cl.
CPC ............ *G01S 13/34* (2013.01); *G01S 13/343* (2013.01); *G01S 13/584* (2013.01); *G01S 13/536* (2013.01); *G01S 13/931* (2013.01); *G01S 2007/356* (2013.01); *G01S 2013/0245* (2013.01)

(58) Field of Classification Search
CPC .... G01S 13/584; G01S 13/536; G01S 13/931; G01S 2013/0245; G01S 7/35; G01S 7/354; G01S 2007/356
See application file for complete search history.

(56) References Cited

U.S. PATENT DOCUMENTS

| 2009/0085800 A1 | 4/2009 | Alland et al. | |
| 2012/0001791 A1* | 1/2012 | Wintermantel | G01S 7/023 342/109 |
| 2013/0027240 A1* | 1/2013 | Chowdhury | G01S 7/032 342/94 |
| 2013/0151201 A1* | 6/2013 | McCorkle | G06F 17/141 702/189 |
| 2014/0347211 A1* | 11/2014 | Schoor | G01S 7/35 342/147 |

FOREIGN PATENT DOCUMENTS

| CN | 102857287 A | 1/2013 | |
| EP | 2045877 A1 | 4/2009 | |
| EP | 204587 * | 8/2009 | ............... H01Q 3/24 |
| JP | 2003315447 A | 11/2003 | |
| JP | 2010156708 A | 7/2010 | |
| JP | 2012202955 A | 10/2012 | |
| JP | 2013026817 A | 2/2013 | |
| WO | 2010115418 A2 | 10/2010 | |

* cited by examiner

METHOD FOR FINDING THE POSITION OF OBJECTS USING AN FMCW RADAR

FIELD OF THE INVENTION

The present invention relates to a method for finding the position of objects using a MIMO FMCW radar. Moreover, the present invention relates to a radar sensor, in particular for motor vehicles, which is configured for carrying out this method.

BACKGROUND INFORMATION

FMCW radar sensors are used in motor vehicles for detecting the traffic environment, in particular for finding the position of other vehicles. The position-finding results may be utilized for various assistance functions, for example, for automatic distance control, automatic collision warning, or automatic triggering of an emergency braking operation when there is the risk of an imminent collision.

The frequency of the baseband signal corresponds to the frequency difference between the signal that is transmitted at a given point in time and the signal that is received at the same point in time. Due to the frequency modulation of the transmission signal, this frequency difference is a function of the propagation time of the signal from the radar sensor, to the object, and back, and thus is a function of the distance from the object. However, due to the Doppler effect, the frequency difference also includes a component that is determined by the relative speed of the object. Therefore, measuring the frequency difference on an individual ramp still does not allow a determination of the distance and the relative speed, but, rather, yields only a linear relationship between these variables. This relationship may be represented in a distance/speed diagram (R-v diagram) as a straight line.

To obtain unique values for the distance and the relative speed, in one common type of FMCW radar, operations are carried out having frequency ramps which rise and fall in alternation. In the R-v diagram a different straight line is then obtained for each ramp, and the distance and the relative speed of the object are given by the intersection point of these two straight lines.

In another specific embodiment, operations are carried out with a sequence of identical, relatively short frequency ramps, so-called "rapid chirps," which have a high frequency deviation in relation to their duration, and therefore are so steep that the distance-dependent component dominates in the baseband signal, while the Doppler component represents only a small correction. This correction is determined by tracking the phase change of the baseband signal from ramp to ramp. Use is thus made of the fact that the phase of the baseband signal responds relatively sensitively to the slight change in the distance from the object, which results from the relative movement of the object from one frequency ramp to the next during the short time interval.

However, since the phase change is a periodic function of the relative speed, the relative speed may be unambiguously determined only when it is so small that the phase change is less than one-half period (i.e., less than $\pi$).

The radar sensor generally includes multiple antenna elements which are spaced apart from one another on a line, for example a horizontal, so that different azimuth angles of the located objects result in differences in the run lengths which the radar signals have to cover from the object to the particular antenna element. These run length differences result in corresponding differences in the phase of the signals which are received from the antenna elements and evaluated in the associated evaluation channels. The incidence angle of the radar signal, and thus the azimuth angle of the located object, may then be determined by comparing the (complex) amplitudes received in the various channels to corresponding amplitudes in an antenna diagram.

In a multiple input/multiple output (MIMO) radar, a higher angular resolution capability is achieved by operating not only with multiple receiving antenna elements, but also with multiple transmitting antenna elements, whereby different combinations of transmitting antenna elements and receiving antenna elements are evaluated. The varying positions of the transmitting antenna elements then result in additional phase differences, and thus, in signals which are equivalent to signals that would be obtained with a configuration using a single transmitting antenna element and additional (virtual) receiving antenna elements. In this way, the aperture is virtually enlarged and the angular resolution is thus improved.

In a MIMO radar, the various transmission signals must be orthogonal with respect to one another. This may be achieved, for example, by code multiplex, frequency multiplex, or time multiplex. However, the code multiplex method requires a high level of effort, and allows only limited orthogonality of the signals. In the frequency multiplex method, there is the disadvantage that the phase and the Doppler shift are a function of the particular wavelength. The method provided here is therefore based on the time multiplex principle. However, there is the problem that relative movements of the located objects in conjunction with the time offset between the various switching states result in phase differences which make the subsequent angular estimation more difficult. One option for compensating for these phase shifts is to estimate the phase shifts caused by the object movements, based on the measured relative speeds; however, this is possible with only limited accuracy.

SUMMARY OF THE INVENTION

The object of the present invention is to provide a time multiplex method for a MIMO radar which allows more accurate angular estimation.

The present invention relates to a method for finding the position of objects using a MIMO FMCW radar, in which a ramp-shaped frequency-modulated radar signal is transmitted whose modulation pattern has a sequence of time-delayed successive ramps, switching over is periodically carried out between at least two switching states in the clock pulse of the successive ramps, the switching states differing in the selection of the antenna elements used for transmission and reception, received radar echoes are down-converted with the transmitted signal into a baseband, the baseband signals obtained for the various switching states are transformed into spectra, based on which the distances and relative speeds of the radar targets are determined, and the phases of the baseband signals obtained for various switching states are compared to one another for determining position-finding angles of the radar targets.

This object is achieved according to the present invention in that the baseband signals are separately subjected to a two-dimensional Fourier transform for each switching state, a ramp-for-ramp transform being carried out in the first dimension and a transform being carried out over a ramp index j in the second dimension, the ramp index counting the ramps within the sequence, using window functions which contain the waveforms of the baseband signals except for a displacement along the time axis, and the spectra obtained for various switching states are subjected to a frequency-dependent phase correction which compensates for the time offset of the ramps.

The present invention allows the baseband signals, obtained in succession for an arbitrary number of switching states, to be based on a mutual reference point in time, so that the phase shifts caused by the object movements are eliminated, without the need for an accurate estimated value for the relative speeds of the objects.

Advantageous embodiments of the present invention are set forth in the further descriptions herein.

In one advantageous specific embodiment, for the windowing of the baseband signals in the second dimension, window functions are used which have the same shape for the various switching states, but which have the same time offset relative to one another as the ramps that are transmitted in the various switching states.

One exemplary embodiment is explained in greater detail below with reference to the drawings.

DETAILED DESCRIPTION

Figure 1:
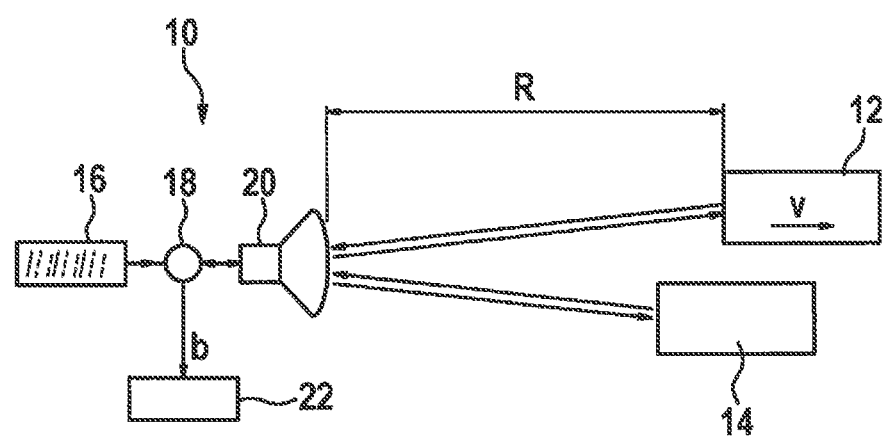
FIG. 1 shows a block diagram of an FMCW radar system.

FIG. 1 illustrates an FMCW radar sensor 10, as a simplified block diagram, which is installed in the front end of a motor vehicle, for example, and used for measuring distances R and relative speeds v of objects 12, 14, for example preceding vehicles. Radar sensor 10 includes a voltage-controlled oscillator 16 which supplies a frequency-modulated transmission signal via a mixer 18 to a transceiver 20, from which the signal is transmitted in the direction of objects 12, 14. The signal reflected on the objects is received by transceiver 20, and is mixed with a component of the transmission signal in mixer 18. In this way, a baseband signal b is obtained which is further evaluated in an electronic evaluation and control device 22.

Figure 2:
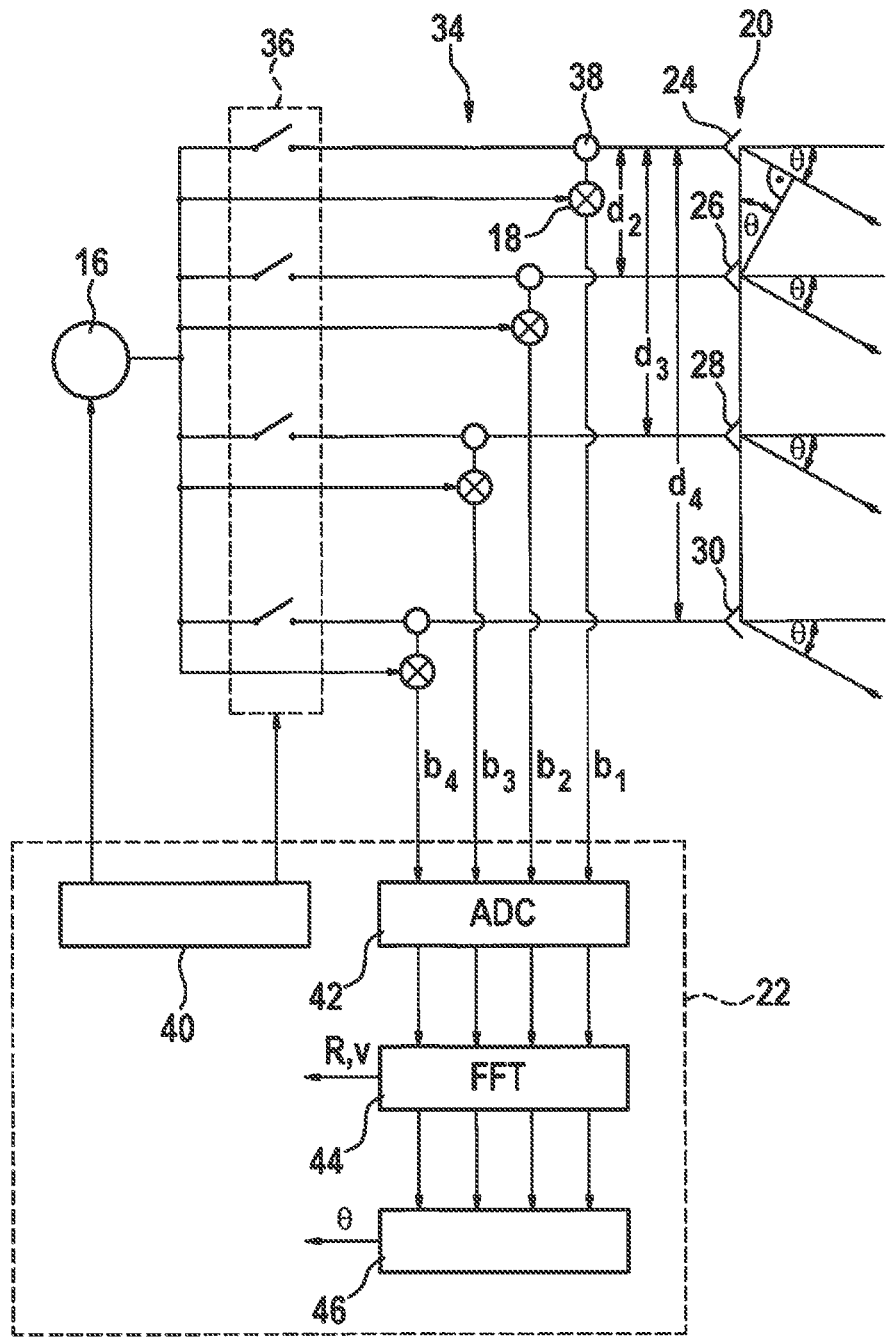
FIG. 2 shows a more detailed block diagram of a MIMO radar sensor.

As shown in FIG. 2, transceiver 20 includes four antenna elements 24, 26, 28, 30 which together form a planar group antenna. The radar sensor is installed in the motor vehicle in such a way that antenna elements 24 through 30 are situated next to one another at the same level, so that a certain angular resolution capability of radar sensor in the horizontal (in the azimuth) is achieved. FIG. 2 symbolically illustrates radar beams which are received from the antenna elements at an azimuth angle θ.

A high-frequency component 34 for controlling the antenna elements is formed by one or multiple monolithic microwave integrated circuits (MMICs), for example, and includes a switching network 36 via which the individual antenna elements are selectively connectable to oscillator 16. The radar echoes received from antenna elements 24 through 30 are each decoupled with the aid of a circulator 38 and are supplied to mixer 18, where they are mixed with the transmission signal supplied by oscillator 16. In this way, for each of the antenna elements a baseband signal b1, b2, b3, b4 is obtained which is supplied to electronic control and evaluation device 22.

Control and evaluation device 22 contains a control portion 40 which controls the functioning of oscillator 16 and of switching network 36. The frequency of the transmission signal supplied by oscillator 16 is periodically modulated in the form of a sequence of rising and/or falling frequency ramps.

In addition, control and evaluation device 22 contains an evaluation portion with a four-channel analog/digital converter 42, which digitizes and records baseband signals b1 through b4 obtained from the four antenna elements. The time signals thus obtained are converted, channel by channel, into corresponding frequency spectra by fast Fourier transform in a transform step 44. In these frequency spectra, each located object is denoted in the form of a peak whose frequency position is a function of the signal propagation time from the radar sensor to the object and back to the radar sensor, and, due to the Doppler effect, is a function of the relative speed of the object. Distance R and relative speed v of the object in question may then be computed from the frequency positions of two peaks which have been obtained for the same object, but on frequency ramps having different slopes, for example a rising ramp and a falling ramp.

As schematically illustrated in FIG. 2 with reference to the radar beams, as a result of the different positions of antenna elements 24 through 30, the radar beams that have been emitted by the same antenna element, reflected on the object, and then received from the various antenna elements, cover different run lengths, and therefore have phase differences which are a function of azimuth angle θ of the object. In addition, associated intermediate frequency signals b1 through b4 have corresponding phase differences. The (absolute values of the) amplitudes of the received signals are also different from antenna element to antenna element, and likewise are a function of azimuth angle θ. The dependency of the complex amplitudes, i.e., the absolute values and phases, of the received signals on azimuth angle θ may be stored for each antenna element in the form of an antenna diagram in control and evaluation device 22. For each located object (each peak in the frequency spectrum), an angle estimator 46 compares the complex amplitudes obtained in the four reception channels to the antenna diagram in order to estimate azimuth angle θ of the object. The value for which the measured amplitudes best correlate with the values read out in the antenna diagrams is assumed to be the most probable value for the azimuth angle.

However, for the MIMO radar described here, the complex amplitudes in the four channels are also a function of which of the four antenna elements 24, 26, 28, 30 is used as the transmission element. For example, switching network 36 allows a first frequency ramp to transmit, using antenna element 24 (the transmission array is then made up only of single antenna element 24), then to switch over to antenna element 26, and then in succession to antenna elements 28 and 30, after which a new cycle begins. In this way, 4×4=16 different configurations are obtained which may be described by the subsequent signal model.

For the planar linear antenna array including antenna elements 24, 26, 28, 30 as a reception array (under the idealized assumption of isotropic antenna elements), control vector $a_{r\mu}$ (θ) has the following components:

$$a_{r\mu}(\theta)=\exp(2\pi i \cdot (d_{r\mu}/\lambda)\cdot \sin(\theta)), \mu=1, \ldots, 4$$

This control vector determines the phase relationships between the complex amplitudes of the signals that are received from the four antenna elements. Index μ denotes the antenna element, and variables $d_{r\mu}$ indicate the positions of the antenna elements in the horizontal, based on any arbitrarily selected origin.

Similarly, control vector $a_{tv}$ (θ) for the transmission array has the following components:

$$a_{tv}(\theta)=\exp(2\pi i \cdot (d_{tv}/\lambda)\cdot \sin(\theta)), v=1, \ldots, 4$$

In the example of a monostatic array with four antenna elements, shown in FIG. 1, the location of antenna element 24 may be taken as the coordinate origin, so that the following applies:

$$d_{r1}=d_{t1}=0,$$

$$d_{r2}=d_{t2}=d_2,$$

$$d_{r3}=d_{t3}=d_3, \text{ and}$$

$$d_{r4}=d_{t4}=d_4$$

For the angular estimation, the virtual array vector is now formed according to the MIMO principle by forming the Kronecker product of $a_{tv}$ (θ) and $a_{r\mu}$ (θ):

$$a(\theta)=(a_{t1}(\theta)a_{r1}(\theta), a_{t1}(\theta)a_{r2}(\theta), a_{t1}(\theta)a_{r3}(\theta), a_{t1}(\theta)a_{r4}(\theta), a_{t2}(\theta)a_{r1}(\theta), a_{t2}(\theta)a_{r2}(\theta), a_{t2}(\theta)a_{r3}(\theta), a_{t2}(\theta)a_{r4}(\theta), a_{t3}(\theta)a_{r1}(\theta), a_{t3}(\theta)a_{r2}(\theta), a_{t3}(\theta)a_{r3}(\theta), a_{t3}(\theta)a_{r4}(\theta), a_{t4}(\theta)a_{r1}(\theta), a_{t4}(\theta)a_{r2}(\theta), a_{t4}(\theta)a_{r3}(\theta), a_{t4}(\theta)a_{r4}(\theta))$$

The product vector has 16 components, corresponding to 16 positions of virtual antenna elements. The components of the vector have the form $$a_{tv}(\theta)\cdot a_{r\mu}(\theta)=\exp(2\pi i \cdot (d_{tv}+d_{r\mu})/\lambda)\cdot \sin(\theta)), v=1, \ldots, 4; \mu=1, \ldots, 4$$

The virtual antenna positions thus correspond to the sums which may be formed from variables d1 through d4. The virtual array thus extends in the horizontal over a much greater span; i.e., it has a larger aperture and thus results in a higher angular resolution, since even small changes in azimuth angle θ result in fairly large phase differences.

It is optionally also possible to simultaneously transmit using multiple antenna elements 24 through 30. This corresponds to an additional virtual transmission antenna element at the position which corresponds to the geometric midpoint of the transmitting antenna elements.

In other specific embodiments, antenna arrays having different designs may be used, for example those in which the antenna elements are situated at different distances from one another. Likewise, bistatic antenna designs are possible in which some antenna elements are used only for transmitting, and others are used only for receiving.

Figure 3:
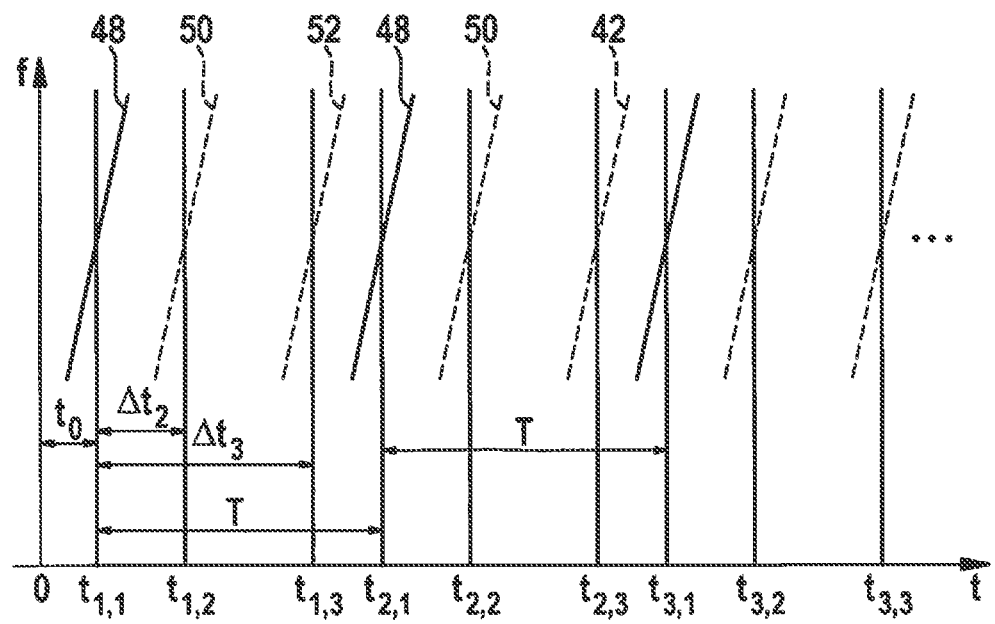
FIG. 3 shows a modulation pattern with repeated sequences of three time-delayed ramps which are transmitted and received with different antenna configurations.

However, for evaluating the signals in the reception channels, it is essential that only one of the various configurations of transmission antenna elements is active at any point in time, so that the received signals may be unambiguously associated with the transmitting antenna elements. For this reason, control circuit 40 is programmed in such a way that sequences of nonoverlapping, i.e., time-delayed, ramps 48, 50, 52 in chronological succession are transmitted, as shown in FIG. 3. After each ramp, switching network 36 is switched into a different switching state, so that the next ramp is transmitted with a different selection of antenna elements. Three different switching states TX, between which switching is cyclically carried out, are provided in FIG. 3. Ramps 48, 50, 52 thus differ in the selection of the antenna elements. Ramps having the same reference numeral are transmitted with the same selection of antenna elements. In this way, overall a sequence of 64 ramps is run through before a corresponding sequence having a different ramp slope begins. In the example shown, all ramps 48, 50, 52 have the same center frequency, the same duration, and the same frequency deviation, and thus also the same slope. However, this is not mandatory. Specific embodiments are also conceivable in which, for example, the center frequencies vary and form a slowly rising or falling ramp.

In FIG. 3, successive ramps 48, 50, 52 of the sequence are counted with a consecutive index j. In addition, associated switching state TX of switching network 36 (TX=1, 2, or 3) is indicated for each ramp. The average time value of each ramp is denoted by $t_{TX,n}$, first index TX indicating the switching state, and second index n indicating the cycle, made up of three ramps (one for each switching state), in which the ramp in question is situated.

Based on a fixed reference point in time t=0, the first ramp (j=1) has a time offset $t_0$. The second ramp (j=2) has a time offset $\Delta t_2$ in comparison to the first ramp, and the third ramp (j=3) has a time offset $\Delta t_3$ in comparison to the first ramp. A complete cycle, which is made up of three ramps 48, 50, 52, has duration T. Accordingly, the following applies:

$$t_{1,n}=t_0+n\cdot T$$

$$t_{2,n}=t_0+\Delta t_2+n\cdot T$$

$$t_{3,n}=t_0+\Delta t_3+n\cdot T$$

For each of the three switching states, an average point in time $t_{TX}$ of the overall sequence may be indicated by forming the average value of all average points in time for ramp average points in time $t_{TX,n}$ associated with switching state TX in question. If N is the number of cycles of three within the sequence, the following average point in time $t_{TX}$ is obtained for each switching state TX:

$$t_1=t_0+T(N+1)/2$$

$$t_2=t_0+\Delta t_2+T(N+1)/2$$

$$t_3=t_0+\Delta t_3+T(N+1)/2$$

The measurements in the various switching states are thus nested in terms of time, and as a whole extend over a relatively long time period N·T, while the effective time offset (difference of the average time values) between the individual states is only $\Delta t_2$ or $\Delta t_3$.

Each individual ramp (having index j) is initially subjected to a one-dimensional Fourier transform in transform block 44. For this purpose, the baseband signal (complex amplitude as a function of time) is sampled at multiple points in time which are uniformly distributed over the duration of the ramp. The sampling points in time are counted with an index k. A fast Fourier transform (FFT) is then applied to the sample values thus obtained for the overall ramp, which yields a one-dimensional spectrum for this ramp, i.e., a complex amplitude $s_j$ as a function of a frequency variable $f_k$.

Overall, a number N of various spectra is thus obtained for each switching state. If a certain frequency value $f_k$ is now fixed, associated amplitudes $s_j$ ($f_k$) may be regarded as a function of ramp index j, which is then used as a discrete time variable, and a fast Fourier transform may be carried out once again for these functions for each $f_k$, according to ramp index j. The result is a function which indicates the amplitude (for a fixed $f_k$) as a function of another frequency variable $f_j$. The complex amplitudes may then be represented together in a two-dimensional frequency space as a function of frequency variables $f_k$ and $f_j$, for which reason the overall process is referred to as a two-dimensional Fourier transform.

To simplify the discussion, it is assumed below that ramps 48, 50, 52 are all offset relative to one another by the same amount T/3:

$$t_0 = T/3$$

$$\Delta t_2 = T/3$$

$$\Delta t_3 = 2T/3$$

Complex amplitude s of baseband signal b may then be described as a function of sample index k and ramp index j after normalization to 1, as follows:

$$s(k,j) = Re(\exp(i(\varphi_0 + 2\pi(f_R + f_v)k\tau + 2\pi f_v jT/3)))$$

In the formula, $\varphi_0$ is a phase offset which is a function only of distance R and the ramp slope, $f_R$ is the frequency component, which is a function of distance R and the ramp slope, $f_v$ is the Doppler frequency, and $\tau$ is the sampling period for the sampling of the individual ramps (having index k).

This formula applies for all three switching states, the only difference being that j in the first switching state may assume only the values 3n+1, in the second switching state may assume only the values 3n+2, and in the third switching state may assume only the values 3n, where n=0, 1, . . . .

In the first step of the Fourier transform (according to index k), the first two terms in the above formula yield a value which is a function of frequency variable $f_k$. However, the second term contains no variables that would be a function of sampling index k, and therefore yields only a constant phase factor, i.e., a factor which is not a function of $f_k$, but which oscillates at Doppler frequency $f_v$ as a function of time.

Figure 4:
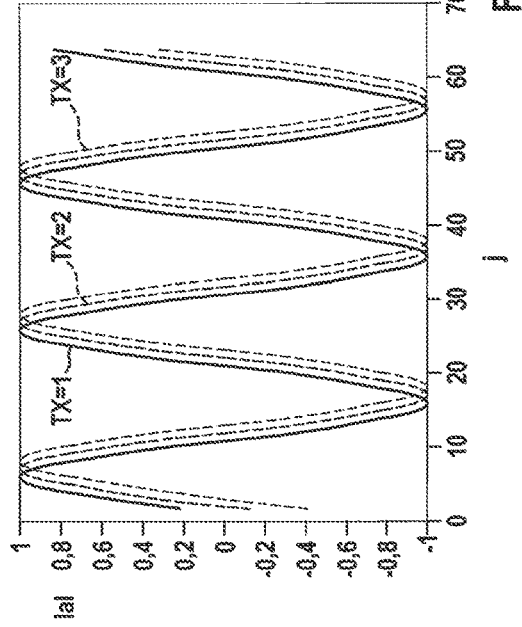
FIG. 4 shows unwindowed baseband signals for the three ramps according to FIG. 3, illustrated in the form of the absolute values of the amplitude as functions of a ramp index j.

Such quasi-time signals, which are obtained after the first step of the Fourier transform for any fixed $f_k$, are illustrated in FIG. 4 for the three switching states TX=1, 2, 3. Ramp index j is used here as the time variable. Reference point in time t=0 is the same as in FIG. 3 (t=jT/3).

Due to the small time offset (T/3) between the switching states, the relative speed and thus the Doppler frequency may be regarded as constant, so that all three signals in FIG. 4 have the same frequency, and are shifted relative to one another on the time axis only by one index point.

Before the second step of the Fourier transform is now carried out, these signals must be windowed with a suitable window function in order to mitigate the abrupt termination of the signal at j=0 and j=65, which would result in undesirable artefacts in the form of secondary maxima.

Figure 5:
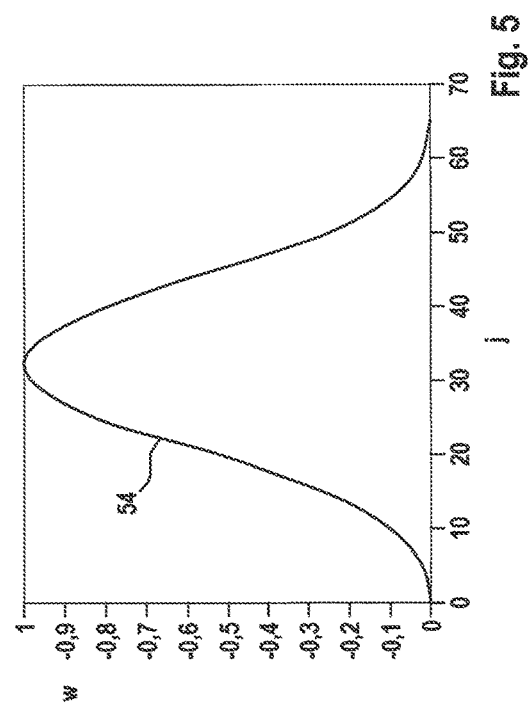
FIG. 5 shows an individual window function.

One example of a common window function 54, a so-called Kaiser window, is shown in FIG. 5. The curve in FIG. 5 indicates weighting w, as a function of line index j, by which the values of the signals shown in FIG. 4 are to be multiplied for line index j in question.

Figure 6:
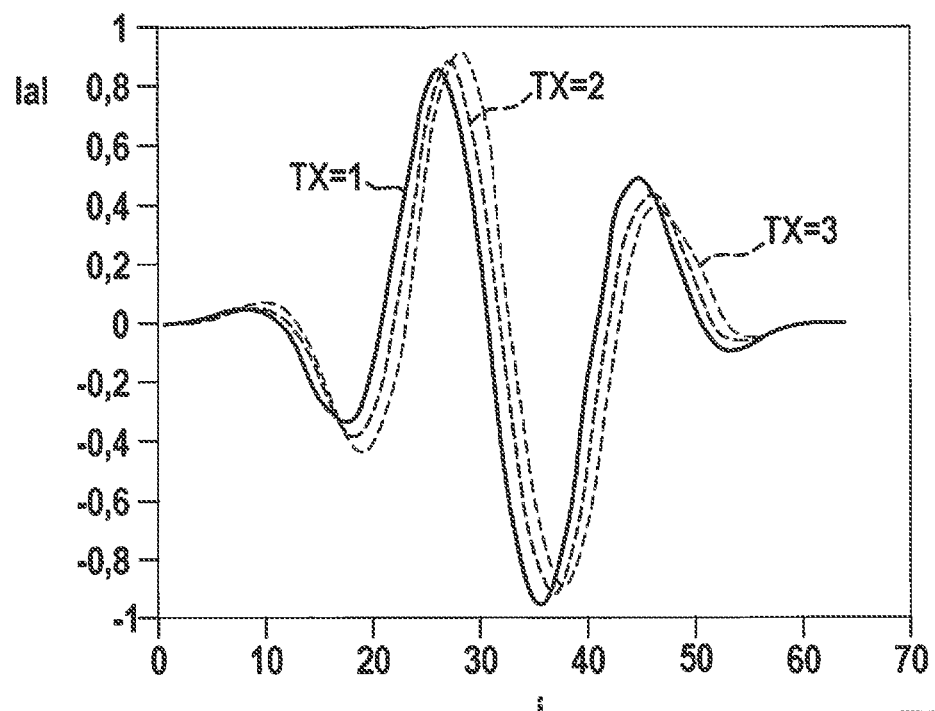
FIG. 6 shows the baseband signals according to FIG. 4 after windowing with the window function according to FIG. 5.

FIG. 6 shows the result for the case that the same window 54, illustrated in FIG. 5, is used for all three signals. However, it is apparent in FIG. 6 that not only are the three signals shifted relative to one another on the time axis, but they also have different waveforms due to the fact that, since they have each been shifted by a different amount with respect to curve 54, they are influenced in a different way by the window function. This type of windowing would thus result in additional phase shifts in the second step of the Fourier transform, which would make a comparison of the phases impossible, or at least difficult. The windowing is therefore carried out with window functions which leave the waveform of the windowed signals unchanged.

Figure 7:
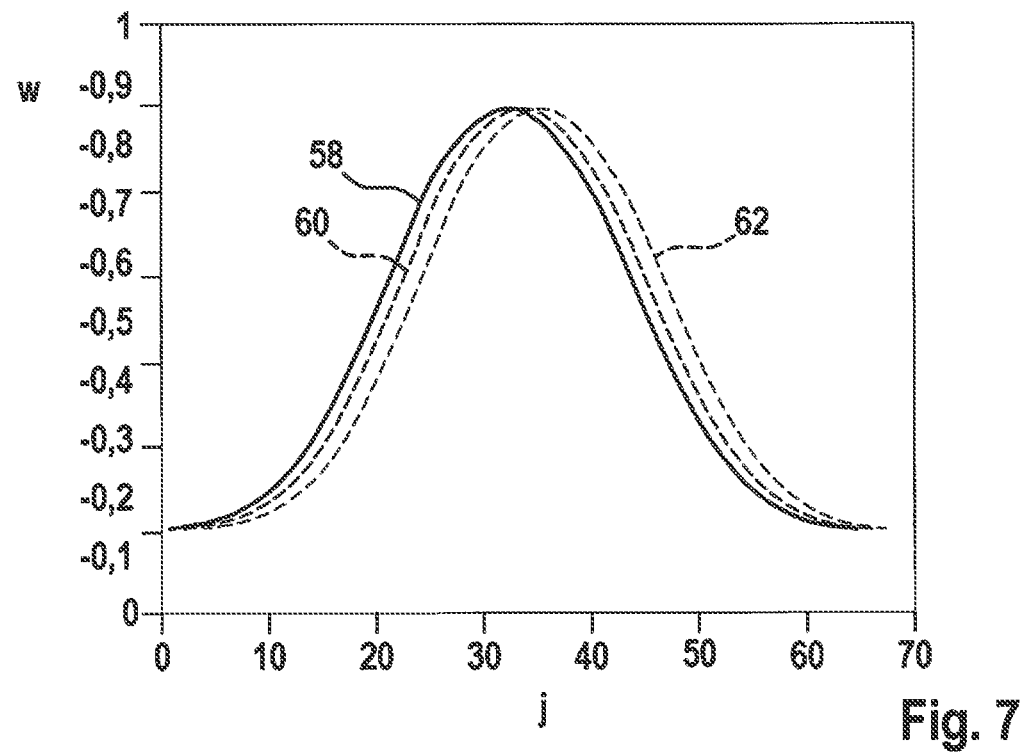
FIG. 7 shows three time-delayed window functions.

This may be achieved, for example, by using a separate window function for each switching state. FIG. 7 shows three window functions which are indicated by curves 58, 60, and 62. Curve 58 is used for ramps 48 (TX=1), curve 60 is used for ramps 50 (TX=2), and curve 62 is used for ramps 52 (TX=3). Curves 58, 60, 62 have the same shape as the Kaiser window in FIG. 5, but are shifted on the time axis by the same amounts (T/3) as for the associated ramps, and accordingly, the signals, in FIG. 4.

Figure 8:
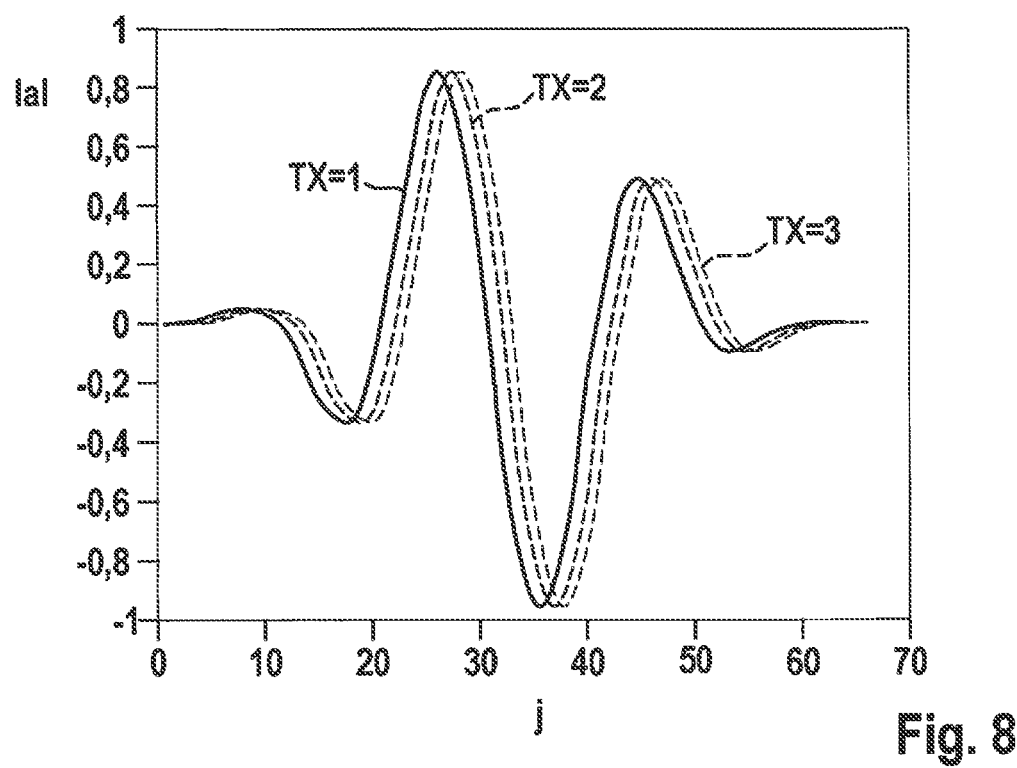
FIG. 8 shows the baseband signals according to FIG. 4 after windowing with the window functions according to FIG. 7.

The result of this type of windowing is shown in FIG. 8. The signals for TX=1, TX=2, and TX=3 have the same waveform here, and are merely shifted relative to one another on the time axis. In the second stage of the Fourier transform, this shift results in a phase factor which is a function not of frequency variable $f_k$, but, rather, only of frequency variable $f_j$.

If N is the number of periods (having three ramps each) in the sequence in FIG. 3, the fast Fourier transform in the second stage is generally carried out in such a way that the space of frequency variables $f_j$ is distributed in N so-called frequency bins $\mu$ ($\mu=0, \ldots, N-1$). Phase factors $\varphi_{TX,\mu}$ are then a function of the particular frequency bin $\mu$, and may be stated for switching states TX=1, 2, 3 as follows:

$$\varphi_{1,\mu} = \varphi_{0,\mu} \text{ (by definition)}$$

$$\varphi_{2,\mu} = \varphi_{0,\mu} + (2\pi\mu/N) \cdot \Delta t_2 \text{(in this example, } \Delta t_2 = T/3)$$

$$\varphi_{3,\mu} = \varphi_{0,\mu} + (2\pi\mu/N) \cdot \Delta t_3$$

If the phases for each switching state and each evaluation channel are now corrected by phase shift $\varphi_{TX,\mu}$ stated above for an object that is represented by a peak at a certain location in two-dimensional frequency space ($f_k$, $f_j$), a set of phase relationships is obtained which, despite the relative movement of the object, is virtually independent of the object distance and also the relative speed, and which is a function only of the run length difference determined by azimuth angle $\theta$, and which thus allows an accurate angular estimation by comparison with the antenna diagram.

What is claimed is:

1. A method for finding a position of an object using a MIMO FMCW radar, the method comprising:
    transmitting a ramp-shaped frequency-modulated radar signal whose modulation pattern has a sequence of time-delayed successive ramps;
    controlling a switch network to provide a corresponding switching state for each respective ramp of the successive ramps, wherein, for each of the switching states, a different selection of antenna elements is used for transmission of the respective ramp, and wherein the switch network is coupled to the antenna elements;
    for each of the switching states, mixing received radar echoes reflected by radar targets with the transmitted signal and down-converting a signal resulting from the mixing into a baseband signal;

transforming the baseband signals obtained for the switching states into spectra, on the basis of which distances of the radar targets and relative speeds of the radar targets are determined; and comparing phases of the baseband signals obtained for the switching states to one another for determining position-finding angles of the radar targets;

wherein each of the baseband signals for each of the switching states is separately subjected to a two-dimensional Fourier transform, a ramp-for-ramp transform being carried out in a first dimension and a transform being carried out over a ramp index j in a second dimension, the ramp index counting the ramps within the sequence, using window functions, a window function being applied to each of the baseband signals prior to the transform being carried out over the ramp index j in the second dimension, a different window function being applied for each of the switching states, and wherein the spectra obtained for the switching states are subjected to a frequency-dependent phase correction which compensates for time offsets of the ramps.

2. The method of claim 1, wherein the different window functions used for the switching states have a same shape, but have time offsets relative to one another that are the same as associated ramps within the sequence.

3. The method of claim 1, wherein switch network is controlled provide a different one of the switching states after each ramp.

4. The method of claim 1, wherein the switching states include at least three different switching states.

5. The method of claim 1, wherein the number of ramps for each sequence is greater than 20.

6. The method of claim 1, wherein the number of ramps for each sequence is greater than 60.

7. A MIMO FMCW radar sensor for finding a position of an object, comprising:

a transmitter including antenna elements,
a switch network coupled to the transceiver;
an oscillator;
a control and evaluation device configured to perform the following:

control the oscillator and the transmitter to generate and transmit a ramp-shaped frequency-modulated radar signal in accordance with a modulation pattern having a sequence of time-delayed successive ramps, and control the switch network to provide a corresponding switching state for each respective ramp of the successive ramps, wherein, for each of the switching states, a different selection of the antenna elements is used for transmission of the respective ramp; and mixers configured to mix, for each of the switching states, received radar echoes reflected by radar targets with the transmitted signal;

wherein the control and evaluation device is further configured to perform the following:

for each of the switching states, down-converting a signal resulting from the mixing into a baseband signal;

transforming the baseband signals obtained for the switching states into spectra, on the basis of which distances of the radar targets and relative speeds of the radar targets are determined; and comparing phases of the baseband signals obtained for the switching states to one another for determining position-finding angles of the radar targets;

wherein each of the baseband signals for each of the switching states is separately subjected to a two-dimensional Fourier transform, a ramp-for-ramp transform being carried out in a first dimension and a transform being carried out over a ramp index j in a second dimension, the ramp index counting the ramps within the sequence, using window functions, a window function being applied to each of the baseband signals prior to the transform being carried out over the ramp index j in the second dimension, a different window function being applied for each of the switching states, and wherein the spectra obtained for the switching states are subjected to a frequency-dependent phase correction which compensates for time offsets of the ramps.

* * * * *